United States Patent [19]
Gatti et al.

[11] Patent Number: 5,392,991
[45] Date of Patent: Feb. 28, 1995

[54] THRUST REVERSING DEVICE FOR JET AIRCRAFT ENGINES

[75] Inventors: Alfredo Gatti, Valenza; Luigi Gerbi, Turin, both of Italy

[73] Assignee: Finmeccanica S.p.A. - Ramo Aziendale Alenia, Rome, Italy

[21] Appl. No.: 71,646

[22] Filed: Jun. 3, 1993

[30]   Foreign Application Priority Data

Jun. 9, 1992 [IT]   Italy .................. TO92A000490

[51] Int. Cl.⁶ ................................... F02K 1/60
[52] U.S. Cl. ..................... 239/265.29; 239/265.31; 239/265.37; 60/232
[58] Field of Search ............ 239/265.29, 265.31, 239/265.33, 265.37; 60/232

[56]   References Cited

U.S. PATENT DOCUMENTS

| | | | |
|---|---|---|---|
| 2,680,948 | 6/1954 | Greene | 239/265.37 X |
| 3,492,821 | 2/1970 | Monaghan et al. | 239/265.29 X |
| 3,532,275 | 10/1970 | Hom et al. | 239/265.33 |
| 4,212,442 | 7/1980 | Fage | 239/265.29 X |
| 4,731,991 | 3/1988 | Newton | 239/265.31 X |
| 4,801,112 | 1/1989 | Fournier et al. | 239/265.31 X |
| 4,966,327 | 10/1990 | Fage et al. | 239/265.29 |
| 5,176,340 | 1/1993 | Lair | 239/265.37 X |

*Primary Examiner*—William Grant
*Attorney, Agent, or Firm*—Herbert Dubno

[57]   ABSTRACT

A thrust reversing nozzle for a jet engine in which a collar is mounted on the discharge nozzle so as to be movable axially relative thereto and between the collar and the nozzle, two thrust reversal half shells are pivotally mounted and, in their closed position, register with and are flush with the collar so that these half shells and the collar extend the nozzle.

3 Claims, 7 Drawing Sheets

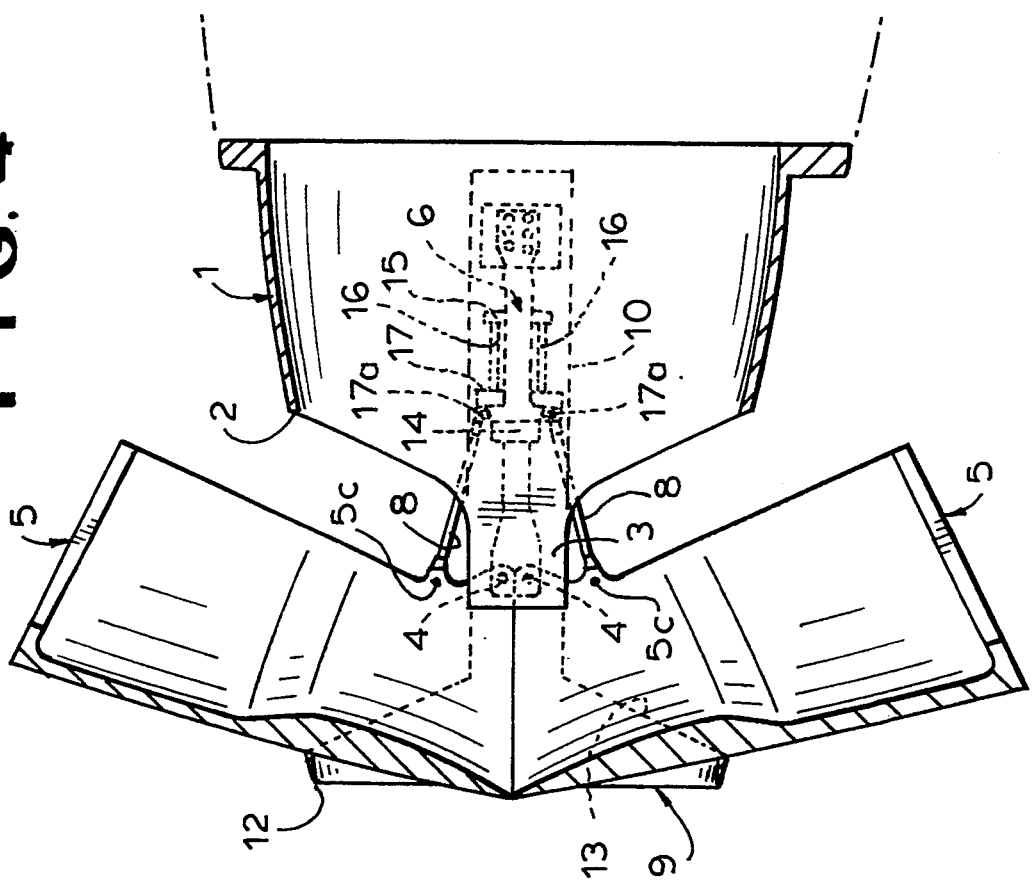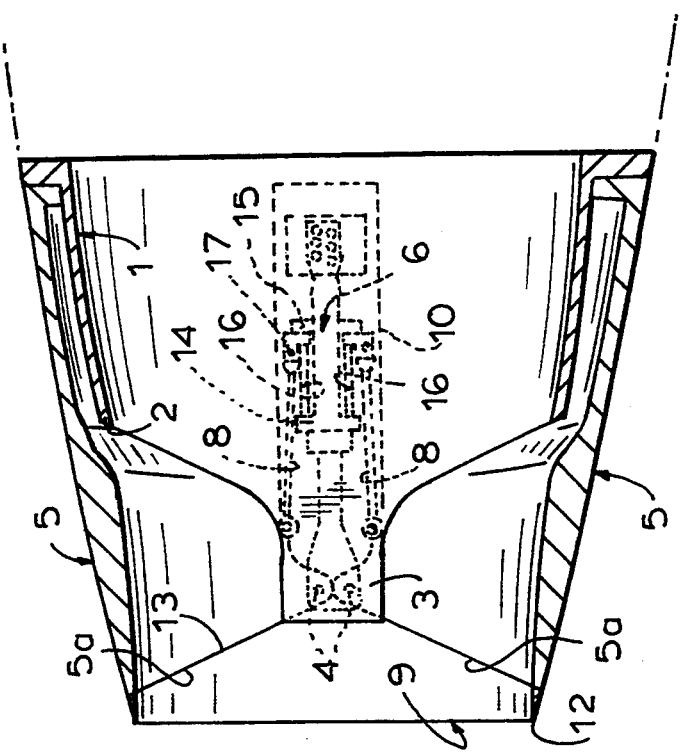

THRUST REVERSING DEVICE FOR JET AIRCRAFT ENGINES

FIELD OF THE INVENTION

Our present invention relates to a thrust reverser for a jet aircraft engine.

BACKGROUND OF THE INVENTION

A thrust reverser of the so called target type is, for instance, illustrated in U.S. Pat. No. 4,966,327. Thrust reversers of this kind include a pair of half-shells hinged to the wall of the engine exhaust nozzle. These shells are movable from a retracted position in which they form a portion of the exhaust nozzle to a deployed position where they form a wall which reverses the jet output by the nozzle. The thrust reverser includes actuators which are responsible for the rotation of the half-shells between their retracted and deployed positions.

A thrust reverser of this known type is illustrated in FIGS. 1, 1a, and 2 in the drawings attached. FIGS. 1 and 2 are schematic side elevations showing the half-shells in their retracted and deployed positions respectively, while FIG. 1a shows the device with retracted shells in a perspective view. With reference to these figures, the exhaust nozzle 1 of an aircraft jet engine can be terminated with a substantially round edge 2. Nozzle 1 extends beyond edge 2 with two diametrally opposite lugs 3, hinged at 4 to which there are two movable half-shells 5 which can be set in a retracted position, shown in FIGS. 1, 1a where they form the last part of the exhaust nozzle, and a deployed position, shown in FIG. 2, where they form the wall which deflects forward the jet output by the engine to obtain the thrust inversion. The movement of the shells is caused by two hydraulic cylinders 6, each held by lug 3, and each inclusive of a piston, not shown in the drawing, connected to two elements 7 which emerge from the cylinder body through two slits in its sides. Elements 7 are connected to actuating rods 8 which are hinged to the two shells 5. As shown by FIG. 2, the curved edges 5a of the two half shells 5 enters into contact in the deployed position of the shells. Due to this, when the shells are retracted, they define an exhaust portion of the exhaust nozzle, with a "fish mouth" cross section.

As the edge 5a of each shell has a variable thickness, in particular is thicker in the middle and thinner at the edges, such "fish mouth" profile gives way to a pair of steps 5b (see FIG. 1a) close to the edge of the exhaust nozzle 1, which cause a degradation of the aerodynamic characteristics of the exhaust duct of the engine during normal flight, with a consequent loss of performance.

The geometry of the exhaust duct of a jet aircraft engine is in fact defined by the manufacturer so as to optimize performance in terms of thrust and of specific fuel consumption at the different operating rates. The geometry selected by the manufacturer corresponds therefore to the best compromise between the various geometries in the different flight conditions. A modification to the exhaust duct caused by the adoption of a thrust reverser of the type described above, will therefore necessarily cause an overall loss of performance throughout the flight profile of the aircraft except at touch-down and also, in the specified case above, an appreciable loss of the thrust coefficient CT and of discharge coefficient CD compared to an ideal nozzle, with a consequent reduction of the available thrust and/or increase of specific fuel consumption for equal engine rates. Steps 5b described above also cause a base drag which increases the drag at null aircraft lift.

OBJECT OF THE INVENTION

The object of this invention is to provide a reverser of the type described above which does not introduce any of the above-mentioned drawbacks and which can be derived from the known- structures described above without having to make any modification to the engine discharge nozzle and/or to the cowling of the engine and without requiring a greater complexity of the actuators of the shells.

SUMMARY OF THE INVENTION

To achieve this result, the thrust reverser of the invention includes a collar which is free to move axially on the termination of the discharge nozzle starting from a fore position, where the collar defines a portion of the discharge nozzle termination to a rear position which allows the deployment of the two half-shells. This collar has a front edge which is shaped so as to be complementary to the end edges of the two half-shells when there are retracted and a trailing edge which defines a circular profile contained in a plane perpendicular to the axis of the discharge nozzle.

Preferably the actuators are also connected to the end of such collar, so as to determine the movement of the collar between its fore and rear positions simultaneously with the displacement of the two half-shells from their retracted and deployed positions.

BRIEF DESCRIPTION OF THE DRAWING

Further features and advantages of the invention become clear from the description which follows, with reference to the drawing attached and wherein:

FIG. 3 is a schematic side elevation with cross section of a thrust inverter according to the invention, with the shells retracted;

FIG. 4 shows the device of FIG. 3 in its active inverting position, with shells deployed;

SPECIFIC DESCRIPTION

Figure 2:
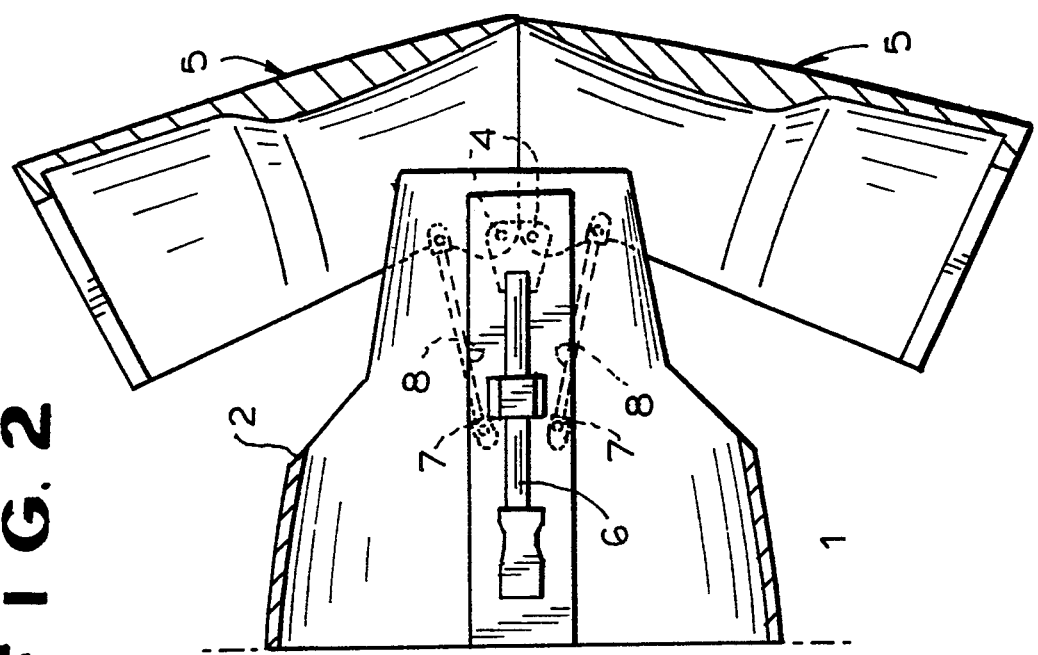
FIG. 2 is a section through the thruster in its "fish mouth" organization.
Figure 1:
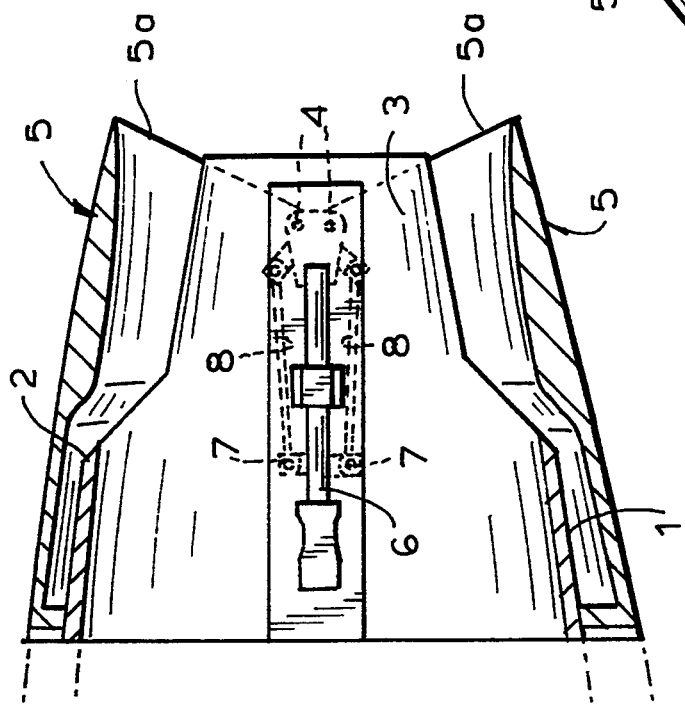
FIG. 1 is a cross sectional view showing a prior art thrust inverter.
Figure 1A:
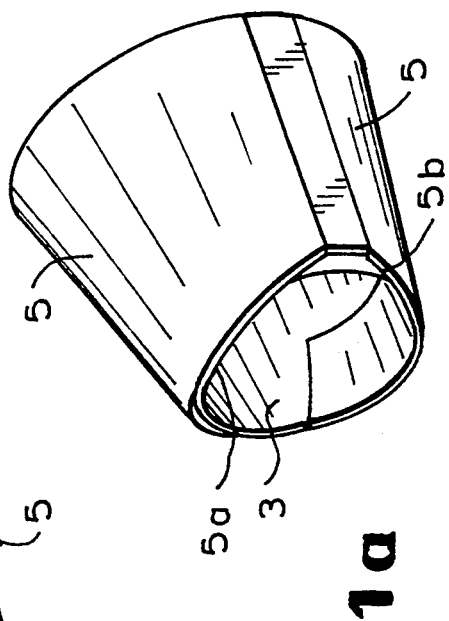
FIG. 1a is a diagrammatic perspective view thereof.

In these figures, parts common to FIGS. 1, 1a and 2 are shown with the same reference numbers.

In the device presented by this invention, a terminal collar 9 is positioned so as to move axially along the discharge nozzle 1 of the jet engine. Collar 9 includes two extended lugs 10, set on diametrically opposite parts of collar 9, which are free to slide along the lengthwise reinforcements 11 of discharge nozzle 1 (FIGS. 6, 7).

As clearly shown in the drawing, collar 9 has circular trailing edge 12 which corresponds to a circular profile in a plane which is perpendicular to the axis of the nozzle and a leading edge 13 which is complementary to edges 5a of half-shells 5 in their retracted position.

Figure 6:
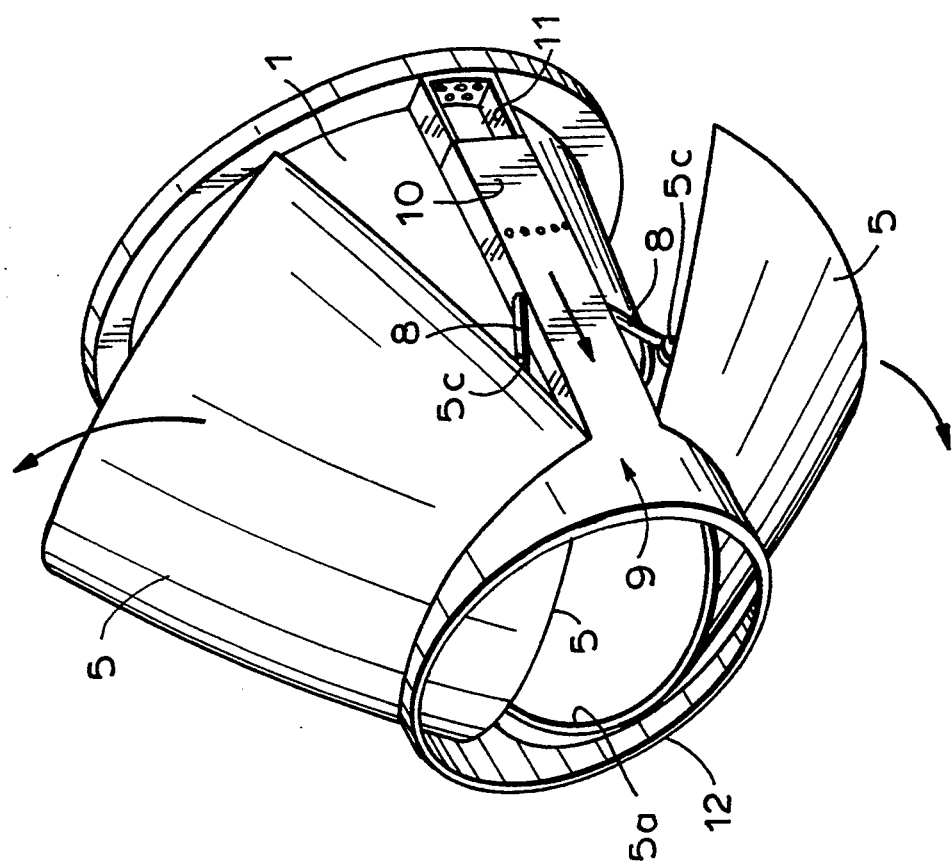
FIG. 6 is a further perspective view of the device when passing from the retracted to the deployed thrust reversing position.
Figure 5:
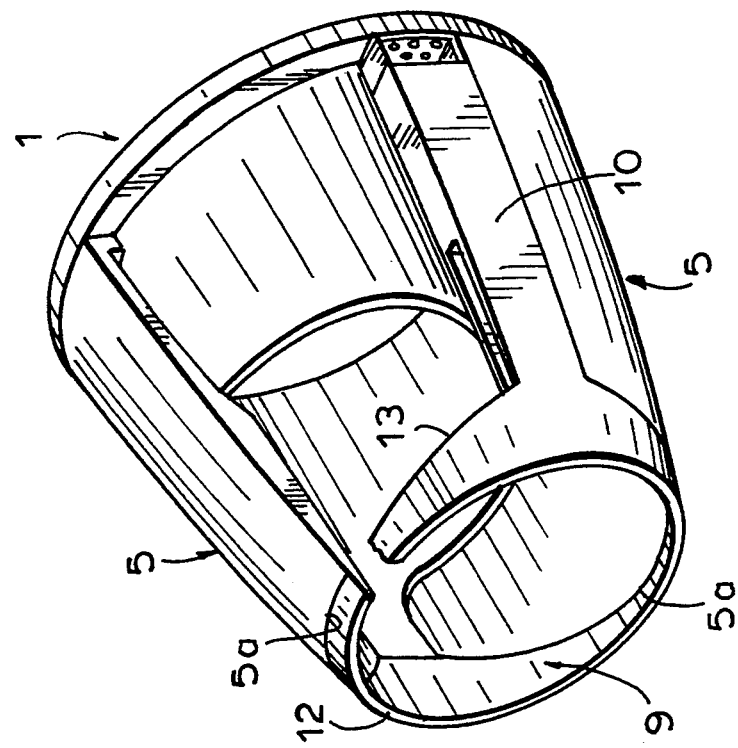
FIG. 5 is a perspective view partially in cross section, of the device of FIG. 3.
Figure 7:
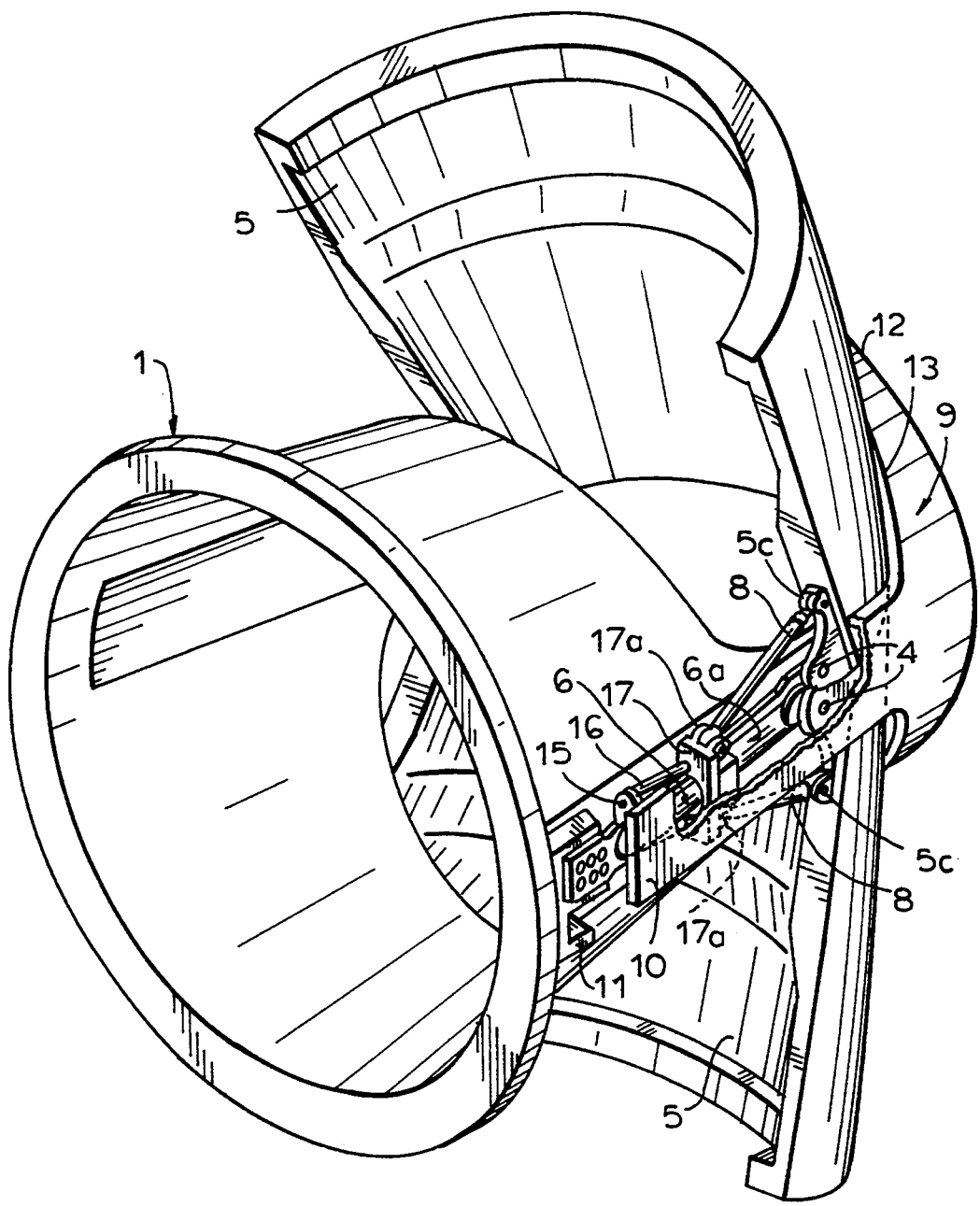
FIG. 7 is a perspective view with partial cross-section which shows the half-shells in their deployed position.

In particular, collar 9 can be relocated between a fore position shown in FIGS. 3, 5 and a rear position shown in FIGS. 4, 6, 7 along the axis of the discharge nozzle simultaneously with the relocation of the two shells 5 between the retracted and deployed positions.

In the fore position of collar 9, to which the retraction of the shells 5 corresponds, the leading edge 13 of collar 9 enters into contact with the terminal edges 5a of the shells 5, so that the collar becomes the terminal position of the discharge nozzle, defining an ideally shaped termination, such as to avoid the inconveniences introduced by the known technique which have been presented above.

In the aft position, collar 9 allows that the two shells 5 can be deployed so as to achieve the thrust inversion required.

Figure 8:
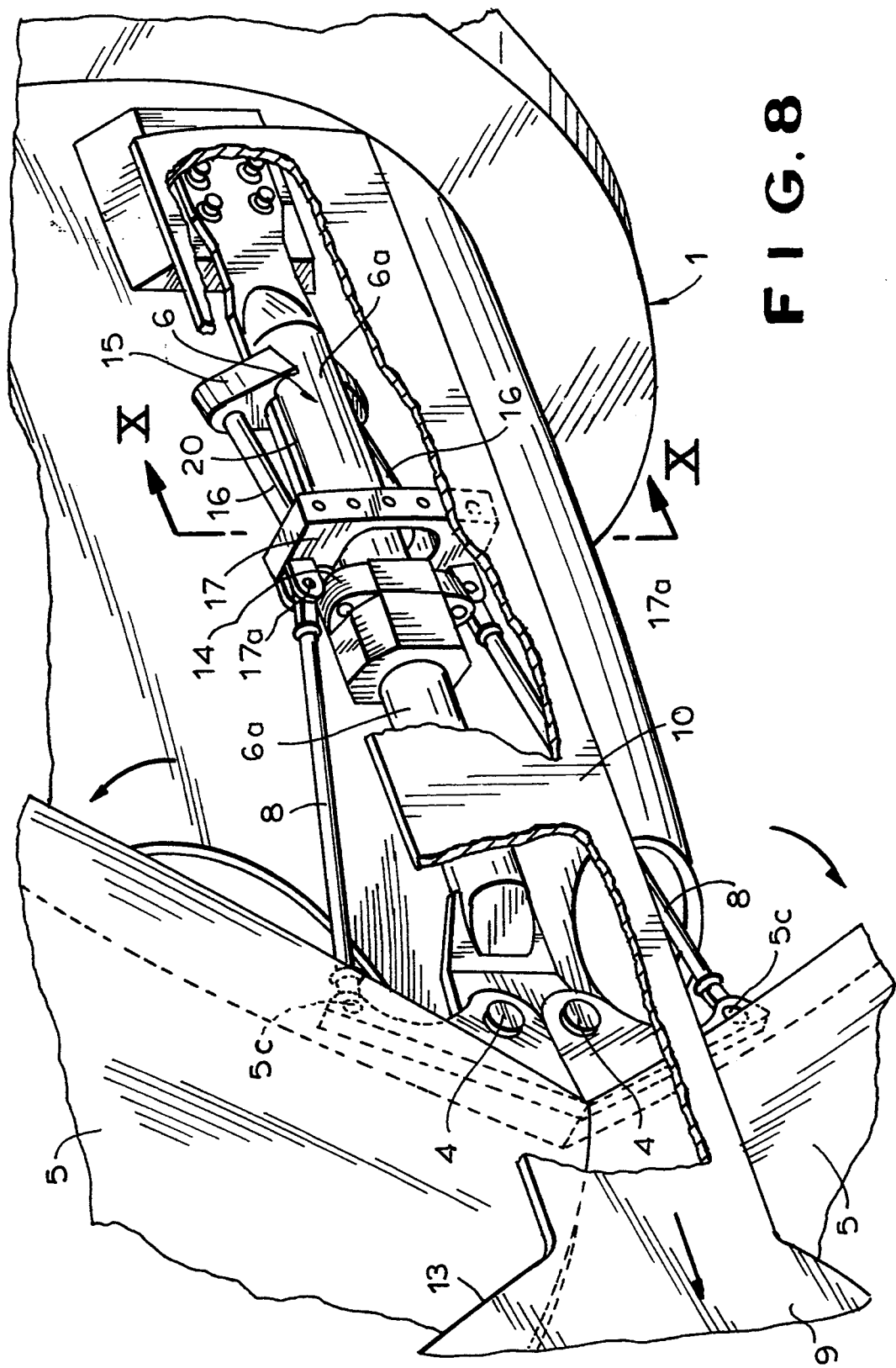
FIG. 8 is a larger scale view with partial cross-section of a detail of the actuator devices.
Figure 9:
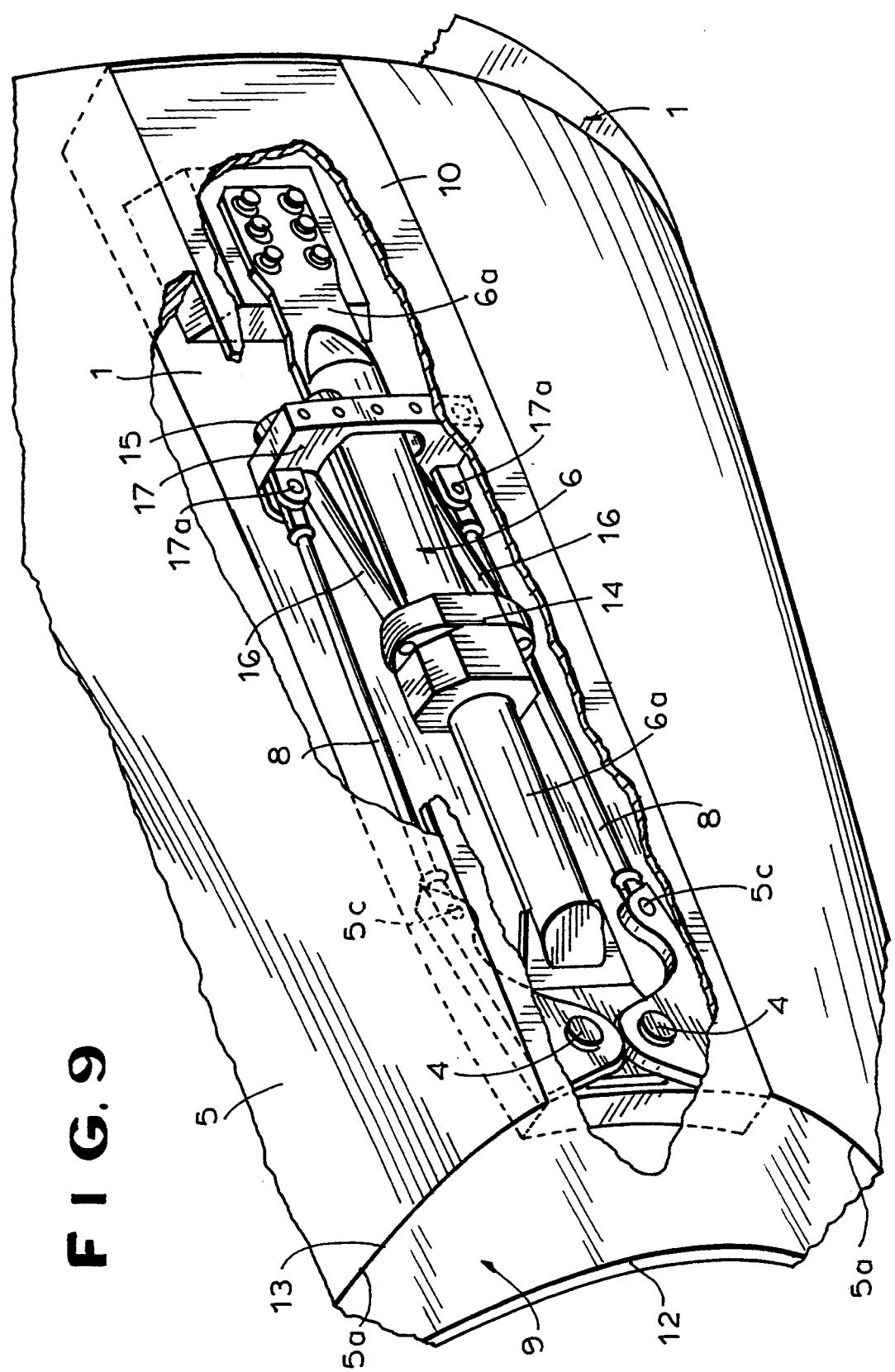
FIG. 9 is a perspective view corresponding to that of FIG. 8 in a different operating condition.

In the preferred mode of actuation the actuating cylinders 6 move the half-shells 5 determining simultaneously the movement of collar 9 from its fore to aft position. In this case it is however to be noted that discharge nozzle 1 has a conical shape, so that cylinders 6 are placed along the surface of a cone, while collar 9 and its lugs 10 must shift in a direction which is parallel to the axis of the cone. To take this condition into account, each hydraulic cylinder 6 (see FIGS. 8, 9) carries a support at its end secured by fixed bars 6a to the nozzle structure 1, equipped with fixed lugs 14, 15 which protrude from such support and are rigidly connected to it. The opposite ends of two cylindrical guiding rods 16 are fixed to the respective lugs and are set parallel to the discharge nozzle axis. Guiding rods 16 of each actuator 6 drive a further rod 17 which has a pair of through holes 17b (FIG. 10) into which the guiding rods 16 are inserted. Each rod 17 is connected solidly to the internal surface of a lug 10 of collar 9. In this manner, collar 9 can slide over the discharge nozzle 1 according to a direction which coincides with its axis. Each rod 17 carries a pair of actuating rods 8 hinged by an end in 17a and with the opposite end hinged in 5c to a half-shell 5, so that a displacement of rods 17 along guiding rods 16 causes a rotation of shells 5 around hinges 4 through rods 8.

The building details of hydraulic cylinders 6 are not provided, as they are of the known type and because these details do no pertain to the scope of this invention.

Figure 10:
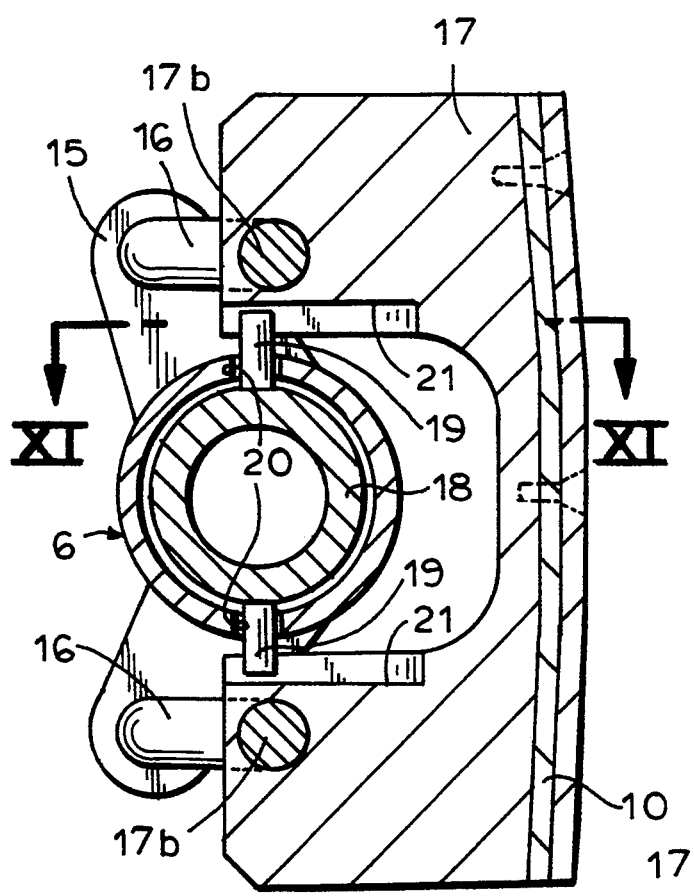
FIG. 10 is a cross section along line X—X of FIG. 8.
Figure 11:
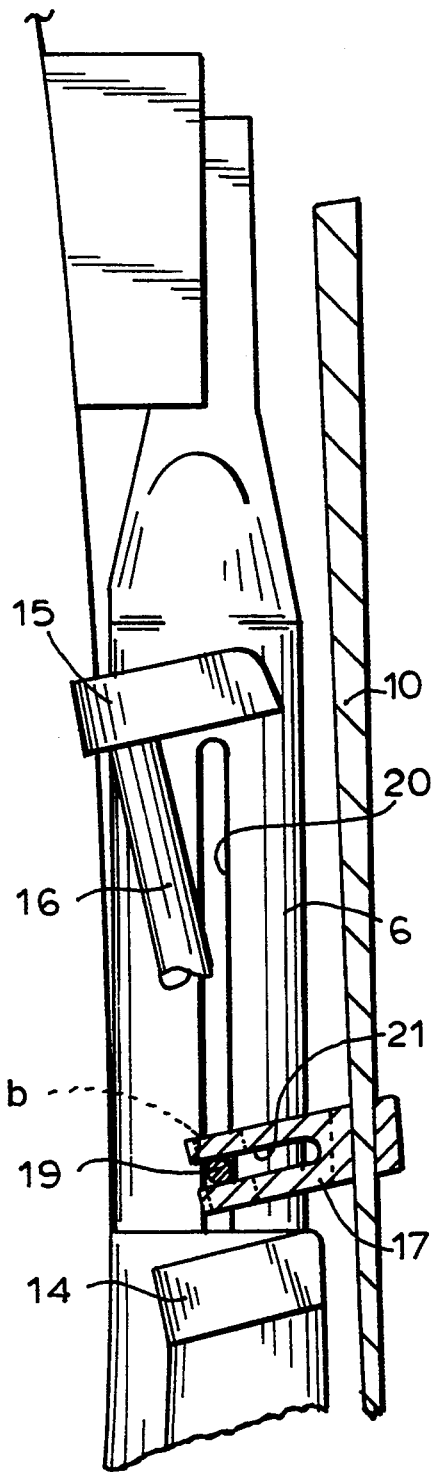
FIG. 11 is a cross section along line XI—XI of FIG. 10.

With reference to FIG. 10, number 18 refers to the piston inside hydraulic cylinder 6, which is equipped with two lugs 19 protruding from cylinder 6 through two slits 20 opened lengthwise in it.

The lugs 19 serve to slide rod 17 along cylindrical rods 16 in response to a movement of piston 18 within cylinder 6.

As such movements take place along different axes, the two appendices 19 are operationally connected to rod 17 through slides which move in two transversal grooves 21 in this rod.

In operation, the activation of the two actuating cylinders 6 in one direction, causes the deployment of the two half-shells 5 towards their final thrust reversing position and simultaneously causes collar 9 to be pushed back. The same actuator cylinders 6, activated in the opposite direction, provide for returning the devices back to their flight position, where the two shells 5 are retracted and collar 9, in its for position, defines the terminal part of the discharge nozzle of the jet engine which now has an optimum exhaust profile.

Of course, with the principle of this invention still valid, the construction details and the forms of actuation may vary substantially compared to what has been described above and illustrated as an example, without departing from the general context of this invention.

We claim:

1. A thrust reversing device for a jet aircraft engine, comprising:

a pair of semi-shells hinged to a wall of a discharge nozzle extending along a nozzle axis and displaceable between retracted and deployed positions, the semi-shells defining a wall of the nozzle deflecting forward a jet output exiting the discharge nozzle in the deployed position and being formed with respective terminal edges;

actuators consisting of two actuating piston and cylinder units mounted externally on opposite sides of the wall of the nozzle for displacing the semi-shells between the retracted and deployed positions, each of the units including a respective cylinder body and a respective piston movable in the body and operatively connected with the respective semi-shell; and a collar including two longitudinal lugs extending forward and free to slide on the discharge nozzle parallel to said nozzle axis, said lugs being operatively connected with respective ones of the pistons to be movable axially therewith and simultaneously with the semi-shells between fore and aft positions of the collar, the collar being formed with a leading edge lying complementary to the terminal edges of the semi-shells upon simultaneous displacing of the collar into the fore position and the semi-shells into the retracted positions, said collar having a trailing edge defining a termination circular profile of the nozzle in a plane extending substantially perpendicular to the axis of the discharge nozzle.

2. The thrust reversing device defined in claim 1 wherein each lug of the collar slides along a respective guide rod extending along the axis of the discharge nozzle and solidly connected to a respective one of the cylinder bodies of the respective actuating piston and cylinder unit.

3. The thrust reversing device defined in claim 2 wherein each lug of the collar is provided with a respective bracket which can slide on a respective one of the guide rods and is connected to a respective piston of the respective piston and cylinder unit through a sliding interface of two cylindrical pivots which are solidly connected to the respective piston and emerge from the cylinder body of the respective piston and cylinder unit through respective lengthwise slits formed therein in corresponding transversal grooves in the respective bracket, the brackets being connected through respective pivoted rods to the respective half-shells.

* * * * *